United States Patent [19]

Wilkerson

[11] 4,294,016
[45] Oct. 13, 1981

[54] AUTOMOBILE HEIGHT GAUGE

[76] Inventor: Edward D. Wilkerson, P.O. Box 755 South Ct., Normandy Beach, N.J. 08739

[21] Appl. No.: 825,023

[22] Filed: Aug. 16, 1977

Related U.S. Application Data

[63] Continuation of Ser. No. 731,061, Oct. 8, 1976, abandoned, which is a continuation of Ser. No. 573,816, May 2, 1975, abandoned.

[51] Int. Cl.³ .............................................. G01B 3/02
[52] U.S. Cl. ................................. 33/180 AT; 33/138; 33/181 AT; 33/169 R
[58] Field of Search ........... 33/138, 180 AT, 181 AT, 33/203 M, 137 R, 169 R; 187/8.43 XA

[56] References Cited
U.S. PATENT DOCUMENTS

| | | | |
|---|---|---|---|
| 1,847,719 | 3/1932 | Hirschel | 187/8.43 |
| 3,036,791 | 5/1962 | Siggelkow | 33/138 |
| 3,281,943 | 11/1966 | Maksim | 33/138 |
| 3,382,583 | 5/1968 | Melton et al. | 33/138 |

*Primary Examiner*—Willis Little

[57] ABSTRACT

An automobile height gauge for measuring the vertical distance between the floor or ground and certain parts of an automobile such as the bumper. A telescopic bar is provided with "U" shaped fittings at each end. These fittings are adapted to fit over the flanges of an automobile lift rack. A cartridge housing a measuring tape is slidably mounted on the telescopic bar. An exposed end of the tape is connected to a permanent magnet. The magnet is adapted to engage magnetically the automobile part whose height is to be measured. The tape is calibrated so that it directly reads the distance from the floor to the end of the magnet and hence the height of the automobile part being measured.

2 Claims, 9 Drawing Figures

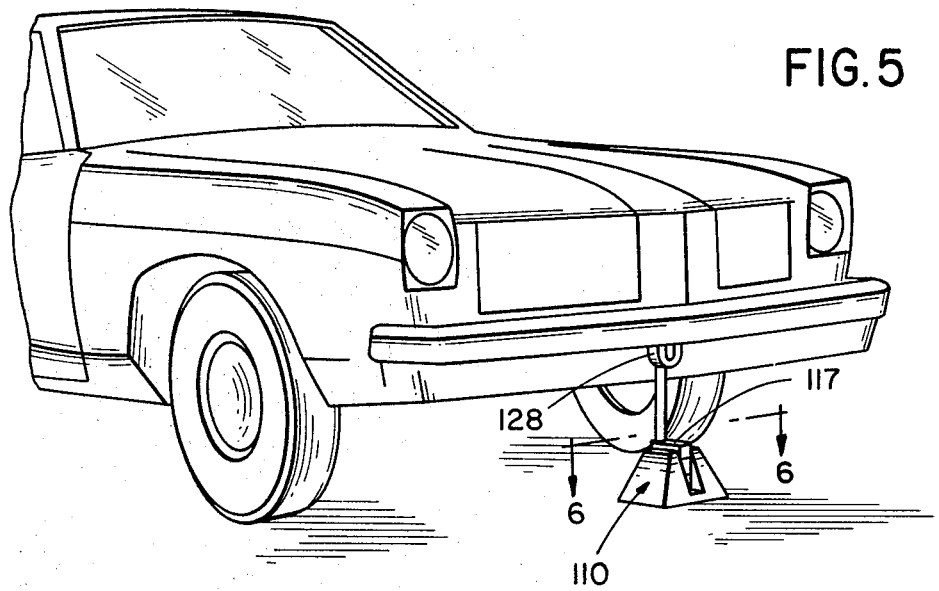
FIG. 5
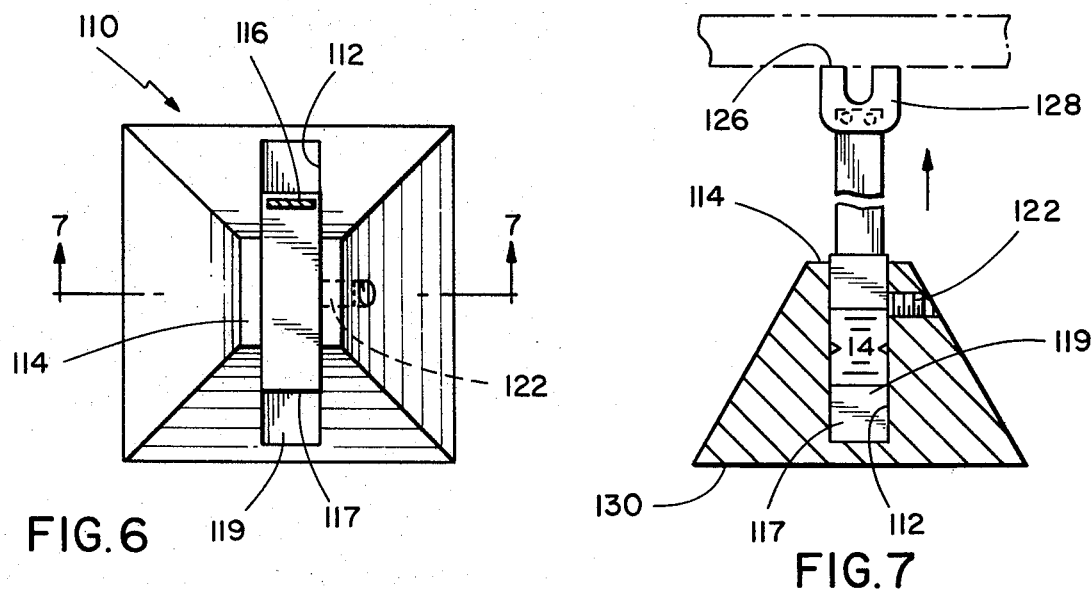
FIG. 6
FIG. 7
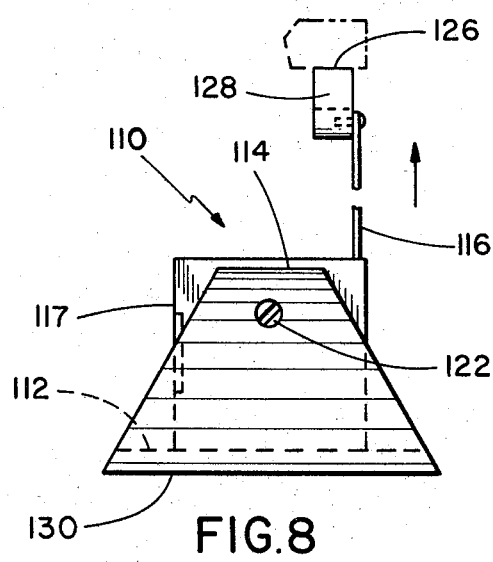
FIG. 8
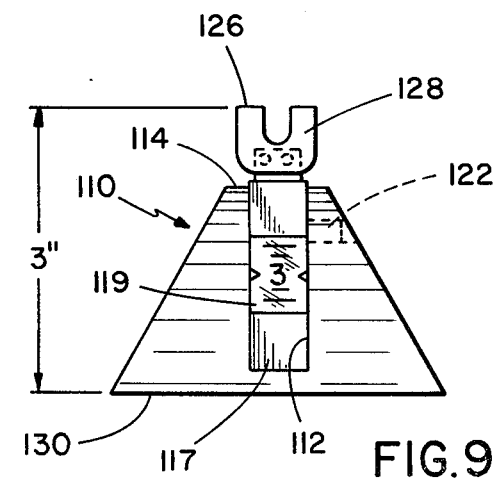
FIG. 9

AUTOMOBILE HEIGHT GAUGE

This application is a continuation of my application Ser. No. 731,061, filed Oct. 8, 1976 which is a continuation of my parent application Ser. No. 573,816, filed May 2, 1975, both abandoned.

BACKGROUND OF THE INVENTION

Because of U.S. Federal specifications of bumper heights (i.e., sprung weight) of land vehicles, the need for a universal height gauge has been created. In the past this height reference has been confined generally to its effect on the wheel camber attitude.

Various car manufacturers specify various points of reference to achieve the desired results. Some specify measurement of upper and lower knee action parts, others specify frame to floor measurement, while others specify torsion bar to floor measurement. To control front bumper heights and disregard rear bumper heights is inadequate in that a majority of car accidents involve the front of one, and the rear of another car. Accordingly, it is anticipated that both front and rear bumper heights will be specified in the future.

While the various car factories can specify a given method or means to their own dealers, this will not suffice for the general service station or repair garage. The need for a comprehensive gauge seems obvious. Such a unit must resolve not only variations in heights, from various points on the various vehicles, but also while the vehicle is in various positions as follows: (1) Torsion bars to floor; (2) Torsion bars to drive on lift; (3) Torsion bars to rack aligner turntables; (4) Side frame rail to floor; (5) Rear frame rails to floor; (6) Frame to lower control arm.

SUMMARY OF THE PRESENT INVENTION

In accordance with the present invention, these prior art problems are obviated in part by providing a height gauge which will allow the car to be placed on a drive-on lift while maintaining a floor equivalent reference in that position. Moreover, the present height gauge can be used to measure the height of side rails, rear springs, lower control arms, front cross members, and in fact any part selected by the car factory.

To accomplish this, a telescopic bar is provided that extends between the lift rails of a drive-on automobile lift. A tape having a magnet on the end of the tape is slidably mounted on the telescopic bar. The tape is calibrated so that it reads directly the vertical distance from the end of the magnet to the drive-on surface of the lift, thereby providing an equivalent reading of the elements whose height above the floor or ground is desired.

According to another embodiment of the present invention, a floor pedestal is provided also having a tape calibrated so that readings may be taken directly from an exposed end of the tape to the floor.

BRIEF DESCRIPTION OF THE DRAWINGS

FIG. 5 is a perspective view of an automobile and another embodiment of the present invention;

FIG. 6 is a top view taken generally along line 6—6 of FIG. 5;

FIG. 7 is a cross-section taken generally along line 7—7 of FIG. 6;

FIG. 8 is a side view of the embodiment shown in FIG. 5; and

FIG. 9 is a front view of the embodiment shown in FIG. 9.

DETAILED DESCRIPTION OF THE PREFERRED EMBODIMENT

Figure 1:
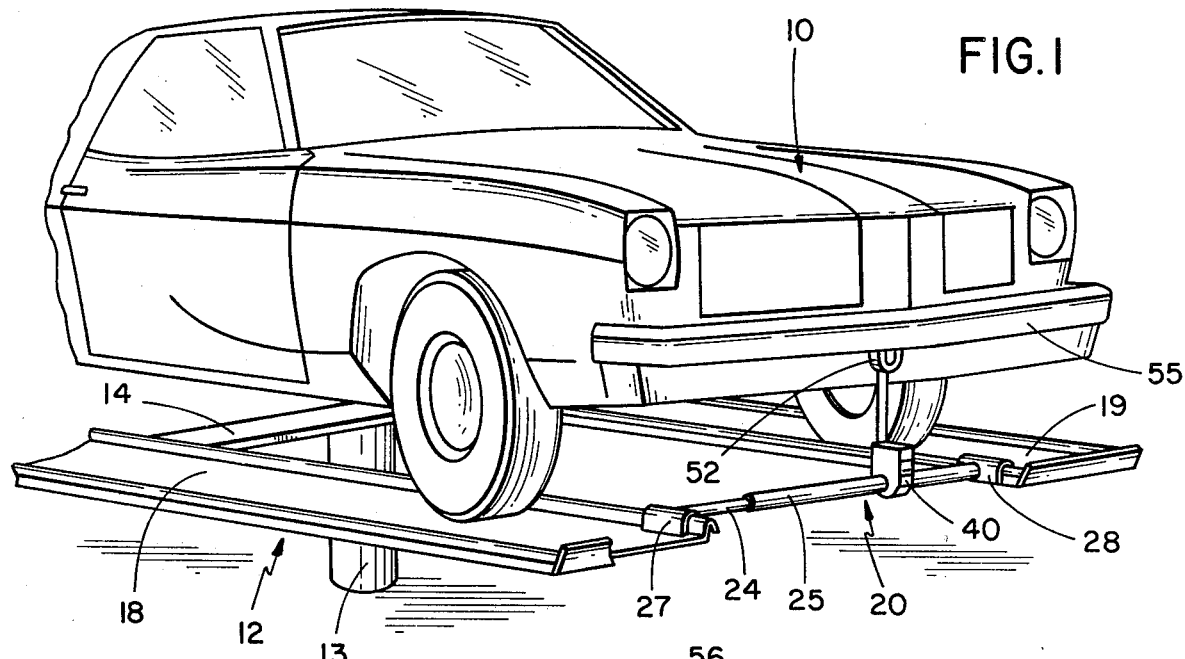
FIG. 1 is a perspective view of an automobile on a drive-on lift with the present height gauge shown in position on the lift.

Referring to the drawings, particularly FIG. 1, an automobile 10 is illustrated on a drive-on lift 12 consisting of vertical elevating post 13, cross member 14 and parallel wheel carrying rails 18 and 19. As seen more clearly in FIG. 2, rails 18 and 19 are formed with "U" shaped inside flanges 22 and 23.

A height gauge 20 is provided according to the present invention that renders a reading from any part of the automobile to the surface of drive-on rails 18 and 19, and thus effectively gives a direct reading from any part of the automobile to the floor or ground, even though the vehicle is not on the ground when the measurement is taken. Accordingly, a height reading may be more easily taken by the operator.

Figure 2:
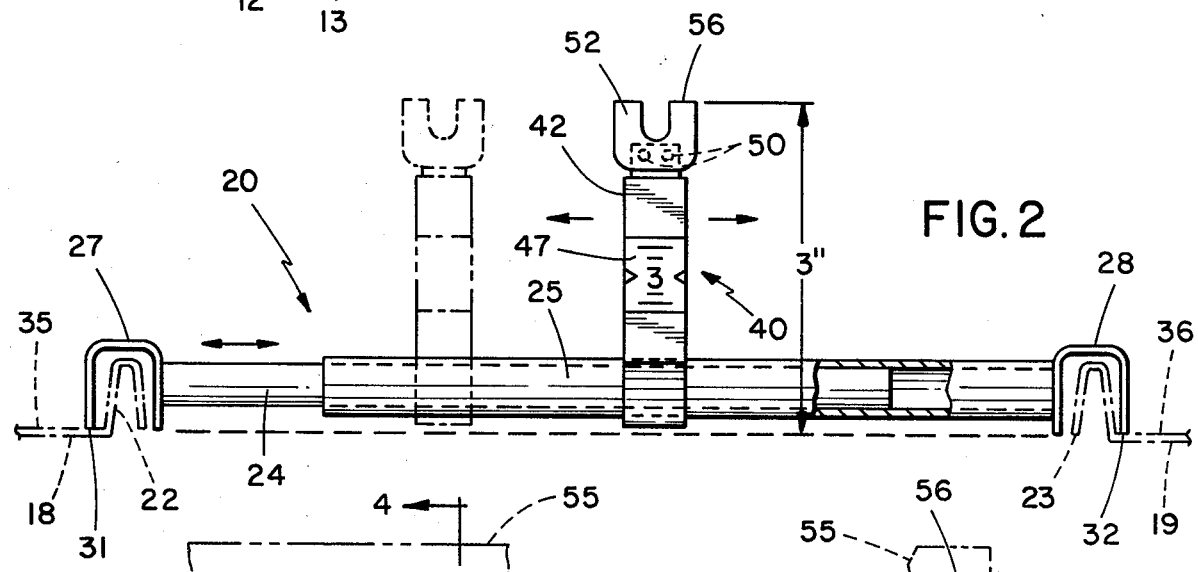
FIG. 2 is a front elevation of a height gauge according to the present invention.

As seen more clearly in FIG. 2, height gauge 20 includes a telescopic horizontal inner section 24 slidable in a telescopic outer section 25. The inner and outer sections have "U" shaped fittings 27 and 28 which fit over the "U" shaped inner flanges 22 and 23 of rails 18 and 19. The outside end surfaces 31 and 32 of the flanges engage the upper surfaces 35 and 36 of the rails 18 and 19 providing a lift reference height equivalent to the floor or ground.

Height gauge 20 may also be positioned directly on the floor or ground. When so mounted, outside end flange end surfaces 31, 32 make direct contact with the ground.

Figure 3:
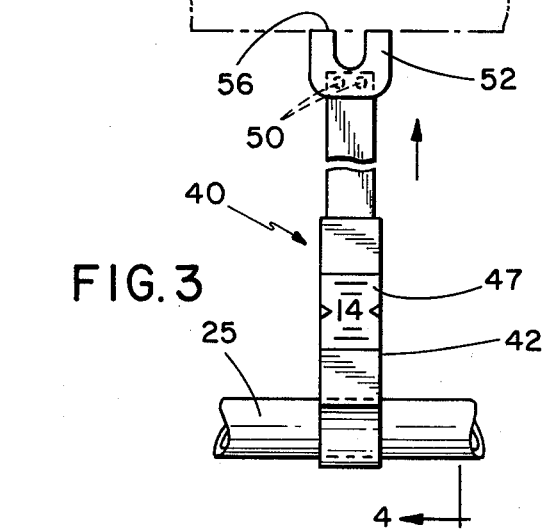
FIG. 3 is a fragmentary view of the height gauge according to the present invention.
Figure 4:
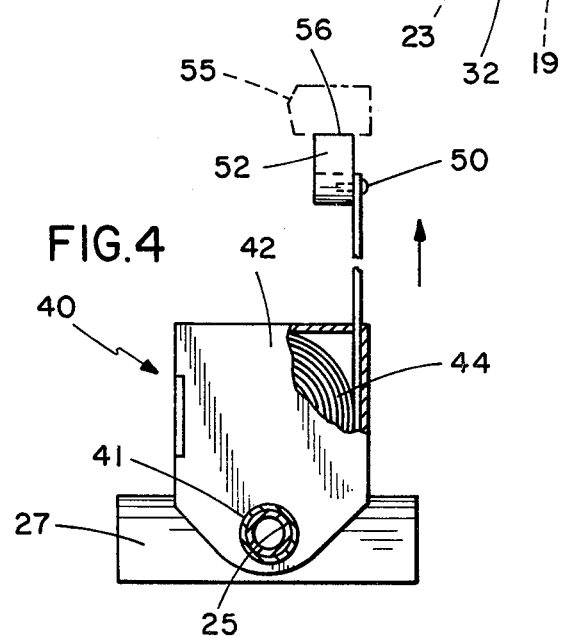
FIG. 4 is a side view taken generally along line 4—4 of FIG. 3.

A tape cartridge assembly 40 is provided having a bushing 41 slidably mounted on the telescopic outer section 25, as seen more clearly in FIG. 4. Tape assembly 40 consists of a generally rectangular cartridge frame 42 having a spring coiled tape 44 therein. The frame 42 has an opening or window 47 for the purpose of viewing the indicia on the tape. A generally "U" shaped magnet 52 is fixed to the end of the tape by fasteners 50 (FIGS. 2, 3 and 4). Magnet 52 is adapted to be attached to the part to be measured, such as the bumper 55 shown in FIG. 1.

An important aspect of the present invention is that tape 44 is calibrated so that it always reads the vertical distance between the upper surface 56 of magnet 52 and the lower surfaces 31 and 32 of the "U" shaped fittings 27 and 28, and thus always provides an accurate measurement from the part to be measured to the floor. For example in FIG. 2, the tape reads three (3) inches in its retracted position, the distance from the top of the magnet (at 56) to the rail surfaces 35, 36. When the tape is extended in making a height measurement, as shown in FIG. 3 and 4, the height reading of the component under measurement appears at window 47.

In view of the fact that height gauge 20 is movable along rails 18, 19, and tape cartridge assembly 40 is also movable in a transverse direction on telescopic section 25, height measurements can be made to almost any vehicle component viewable from the underside of the vehicle.

A further embodiment of the present invention is shown in FIGS. 5 to 9, particularly adapted for use directly on the floor rather than on a drive-on lift. In this embodiment, the truncated pyramid pedestal 110 is illustrated having a rectangular slot 112 extending downwardly from upper surface 114. Seated within the opening 112 is a spring tape 116 having a cartridge or frame 117 with an opening 119 therein so that tape 116 may be easily viewed by the operator. Threaded fastener 122 holds the tape cartridge 117 in position and permits some calibration of the tape.

As with the embodiment of FIGS. 1-4, tape 116 is calibrated so that it always reads the distance from upper surface 126 of magnet 128 to lower surface 130 of the pedestal. This calibration gives a direct reading of the distance of any part of the automobile to ground or floor. For example, in FIG. 9 the fully retracted position of tape 116, the reading at window 119 is three (3) inches, which is the distance between upper magnet surface 126 and lower pedestal surface 130.

What is claimed is:

1. In a height gauge for measuring the vertical distance between a vehicle tire support tread and certain selectable parts of a vehicle, and in which the vehicle may be either ground supported or it may be lift supported by a lift which has a pair of separated tire tread engaging supports with each support formed with an upwardly projecting tire guide element, and in which the gauge has an elongated horizontal bar member, a measuring tape cartridge frame mounted for movement along said bar member, coiled tape means in said frame, a magnet carried by the end of said tape means and window means in said frame positioned so that the numerical calibration reads directly the distance from the end of the magnet to the vehicle tire support tread, the improvement comprising a fitting fixed to each end of said bar member and each individually adapted to fit over a guide element or to rest on any vehicle ground support surface, each of said fittings being U-shaped in configuration with at least one leg of the U-shaped fitting being engageable with a vehicle ground support surface or with the tire tread engaging support surface of the lift so that the height gauge measures height from the vehicle tire support tread as a reference and in which the fittings are formed with sufficient clearance so that the bight portion of each does not engage an associated lift tire guide element, and in which both legs of each fitting extend below the elongated horizontal bar member.

2. In a height gauge for measuring the vertical distance between a vehicle tire support tread and certain selectable parts of a vehicle, and in which the vehicle may be either ground supported or it may be lift supported by a lift which has a pair of separated tire tread engaging supports with each support formed with an upwardly projecting tire guide element, and in which the gauge has an elongated horizontal bar member and a measuring tape frame mounted for movement along said bar member with the tape adapted to read directly the distance from a selected vehicle part to the vehicle tire support tread, the improvement comprising a fitting fixed to each end of said bar member and each individually adapted to fit over a guide element or to rest on any vehicle ground support surface, each of said fittings being U-shaped in configuration with at least one leg of the U-shaped fitting being engageable with a vehicle ground support surface or with the tire tread engaging support surface of the lift so that the height gauge measures height from the vehicle tire support tread as a reference and in which the fittings are formed with sufficient clearance so that the bight portion of each does not engage an associated lift tire guide element, and in which both legs of each fitting extend below the elongated horizontal bar member.

* * * * *